July 8, 1969
W. F. PAHLCK
3,454,056
GUIDE MEANS FOR POWER HANDSAWS
Filed Sept. 27, 1966
Sheet 2 of 2
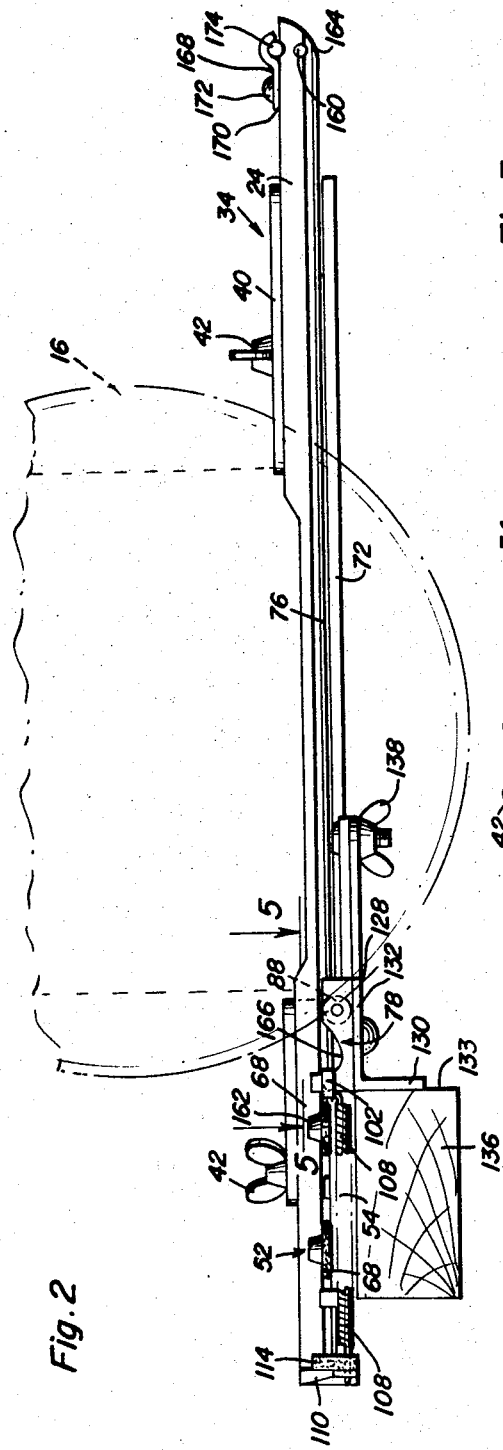
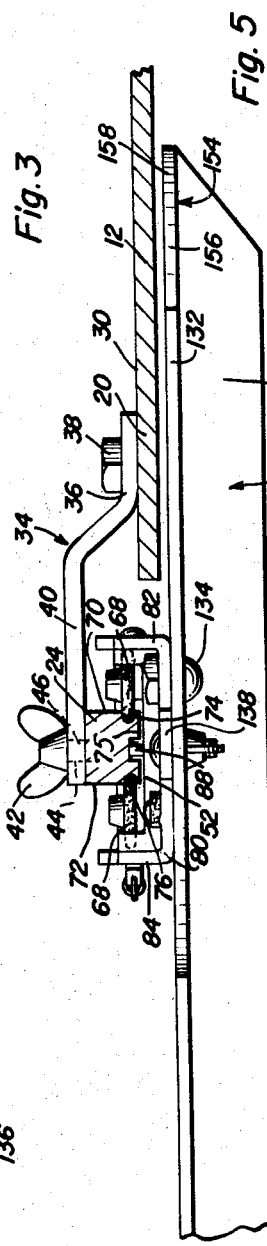
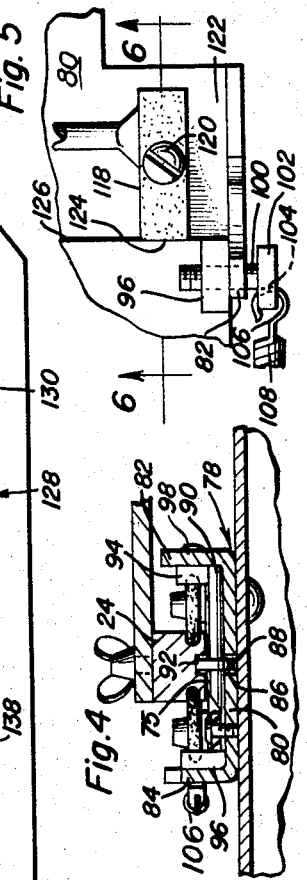
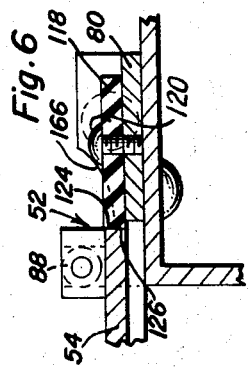
Walter F. Pahlck
INVENTOR.
BY *Clarence A. O'Brien*
and *Harvey B. Jacobson*
Attorneys United States Patent Office 3,454,056
Patented July 8, 1969

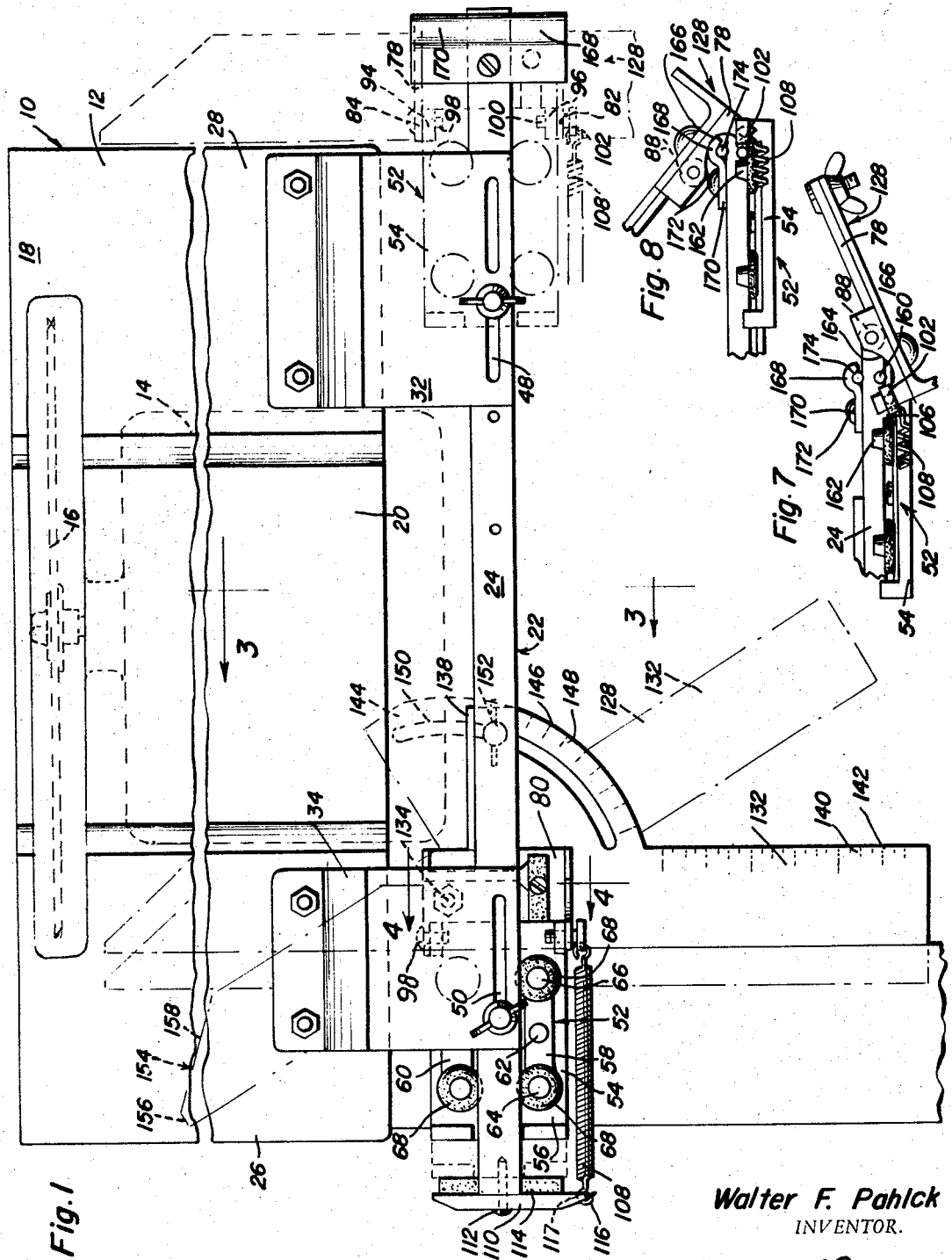

3,454,056
GUIDE MEANS FOR POWER HANDSAWS
Walter F. Pahlck, Rte. 52, Stormville, N.Y. 12582
Filed Sept. 27, 1966, Ser. No. 582,302
Int. Cl. B27b 27/06, 5/18
U.S. Cl. 143—6                12 Claims

ABSTRACT OF THE DISCLOSURE

A guide assembly including an elongated horizontal bar for securement to the base plate of a powered circular saw with the bar paralleling the plane of the saw blade of the saw. A follower is mounted on the bar for guided movement therealong and a guide structure is pivotally supported from the follower for oscillation about an axis extending transversely of the bar between a first position with an elongated work-engaging portion of the guide structure disposed below the bar and a second position with the guide structure free of portions thereof disposed below the bar. Also, the guide structure and the bar include coacting portions preventing pivotal movement of the guide structure from the first position to the second position until one end of the bar is advanced toward the guide structure to a position at least immediately adjacent the guide structure.

---

This invention generally appertains to improvements in saw guide means and more particularly relates to a novel guide means for portable power-driven hand-operated circular saws.

Conventional power handsaws comprise a motor with a circular saw blade carried and driven by the shaft of the motor and with the latter mounted on a flat base plate, which plate is adapted to rest on a piece of material with the power handsaw being pushed by hand across the material so that the motor driven circular saw blade will quickly form a cut in the material. However, one of the principal difficulties in the use of such power handsaws is the fact that they operate so speedily that they are difficult to control to the extent that a workman, particularly an inexperienced carpenter, finds it extremely difficult to direct the saw on an accurate line so as to form an accurate square cut or any angular cut in the material.

Accordingly, an important object of the present invention is to provide a novel guide means which is detachably structurally associated with the base plate and which is provided so that the saw can be moved through the material in accurate compliance with the guide means whereby a true and proper cut can be formed in the material, regardless of the skill of the operator.

Another important object of the present invention is to provide a guide means which can be easily attached to and removed from the base plate and which is formed so that in its structural association with the base plate, without the use of any external measuring or calibrating means, it can be adjustably fixed in a selected position so as to enable a person to move the circular saw quickly and easily through the material or workpiece with the assurance that the cut will be of the desired angle, with the guide means being capable of achieving true square cuts or accurate cuts at any angle between 90° and approximately 135°.

Another important object of the present invention is to provide a novel guide means which will automatically move out of engagement with the material so as to permit the saw to continue in its cutting relation with the material, in the event that the material being cut is wider than the base plate, which carries the guide means. The latter object is of importance because one of the principal drawbacks with saw guides has been that the same interfere with the operation of the power-driven hand-operated circular saws when the material is of a width greater than the length of the base plate of the power handsaw.

Another important object of the present invention is to provide a very simple and extremely uncomplicated guide means, which is very light in weight so as to not add materially to the weight of the power handsaw and which can be manufactured and sold at extremely low cost and which will require very little, if any, maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a conventional power handsaw with a guide means, constructed in accordance with the principles of the present invention, structurally associated therewith and with the motor and circular blade of the saw removed and illustrated in phantom lines;

FIGURE 2 is a side elevational view of the assemblage shown in FIGURE 1;

FIGURE 3 is a detailed, transverse vertical sectional view, taken substantially on line 3—3 of FIGURE 1;

FIGURE 4 is a detailed, vertical cross-sectional view, taken substantially on line 4—4 of FIGURE 1;

FIGURE 5 is a fragmentary longitudinal horizontal sectional view, taken substantially on line 5—5 of FIGURE 2;

FIGURE 6 is a fragmentary longitudinal, vertical sectional view, taken substantially on the line 6—6 of FIGURE 5;

FIGURE 7 is a fragmentary side elevational view of the support for the guide member and illustrating the guide member in the start of its upward swinging movement, and, FIGURE 8 is a view similar to FIGURE 7 but showing the guide member in a fully raised position, where it is above the plane of the base plate so that the power handsaw can be continued to be moved through the material which may be of greater width than the length of the base plate and whereby the guide member does not offer any obstruction to the continued cutting operation.

Referring more particularly to the accompanying drawings, the numeral 10 generally designates a conventional power handsaw, which includes a flat base plate 12 on which a motor 14 is mounted. The motor drives the usual rotary or circular saw blade 16, which is operatively disposed adjacent the side edge portion 18 of the base plate 12. The plate 12 is elongated, flat and includes a side edge portion 20 remote from the blade 16.

The guide means of the present invention, generally designated by the reference numeral 22, is disposed adjacent the side edge portion 20 and includes an elongated follower bar 24, disposed alongside of and spaced laterally from the side edge portion 20. The bar 24 extends parallel with the base plate and is slightly longer than the base plate so that it projects beyond the front edge portion 26 and the rear edge portion 28 of the base plate.

The bar 24 is attached to the upper face 30 of the base plate at the side edge portion 20 by means of bracket arms 32 and 34. Each of the bracket arms is formed with a flat inner mounting flange portion 36 fixedly superimposed on the upper face 30 of the base plate by bolts 38 or other suitable fastening means so that the bracket arms project outwardly and upwardly from the side edge portion 20 of the base plate and terminate in horizontal, free end portions 40 which are coplanar and lie in a plane above the base plate 12. The brackets 32 and 34 are disposed adjacent the forward end portion 26 and the rearward end portion 28, respectively, and are spaced apart along the base plate 12. The bar 24 is attached to the horizontal portions 40 of the adapter brackets or bracket arms 32 and 34 by means of wing bolts 42 threaded into suitable openings 44 formed vertically in the bar and whose shanks 46 are slidable in adjustment slots 48 and 50 provided in the portions 40, whereby the bar 24 may be moved lengthwise relative to the base plate and the attached bracket arms 32 and 34.

The guide means 22 also includes a guide 52 which is movable lengthwise or axially of the bar 24. The guide 52 comprises a body portion 54 which is in the form of a plate that lies in a plane above the plane of the base plate 12 of the saw construction and is provided with an upper face 56. A pair of arms 58 and 60 is fixed by bolt means or other suitable fasteners 62 in axial alignment and disposed axially in laterally spaced relation on the upper face 56 of the body portion 54. The arms each have opposite ends provided with upstanding axles 64 and 66 on which rollers 68 are rotatably disposed.

The bar 24 is formed with opposite sides 70 and 72 provided with longitudinally extending grooves 74 and 76 in which the rollers 68 are rotatably disposed, as shown in FIGURES 1, 3 and 4. Thus, the body portion of the guide 52 is mounted for sliding movement lengthwise of the bar 24 and is disposed above the plane in which the base plate 20 lies.

A channel-shaped tailpiece 78 forms a part of the guide 52 and is disposed at the rearward end thereof. The tailpiece 78 is formed with a bottom wall 80, which underlies the bottom wall 75 of the bar 24, and with upstanding side walls 82 and 84. The bottom wall 80 is formed with a longitudinal slot 86 to accommodate a vertically orientated roller 88, the roller being rotatably carried on the inner end of the shaft 90 which is secured to the wall 82 and extends inwardly therefrom. The bottom wall 75 of the bar 24 is formed with a longitudinally extending, substantially centrally disposed groove 92 in which the vertical roller 88 is rotatably disposed.

The body portion 54 is formed adjacent its rearward end with upstanding apertured ears 94 and 96 and the forward ends of the side walls 82 and 84 of the tailpiece are disposed in overlapping relation with the apertured ears and are provided with registrable apertures for the reception of pivot pins 98 and 100, whereby the tailpiece is pivotally attached to the slidable body portion of the guide 52.

The pivot pin 100 has a projecting head 102 which is provided with a suitable opening 104 to receive the hook end 106 of a retraction spring 108. The forward end of the support bar 24 is provided with a transverse head 110 which is fixed to the front end of the support bar by a fastener 112 and extends laterally beyond the sides 70 and 72 of the support bar and carries on its inner face a resilient buffer member 114 against which the front end of the body portion of the carriage means is adapted to abut, with the front hook end 116 of the retraction spring being anchored in a suitable opening 117 formed in the outer laterally extending side of the head 110. Thus, the spring serves to retain the guide 52 at the forward end of the bar 24 and to urge the same forwardly after it has been moved rearwardly, in a manner that will be described.

It is to be noted that the tailpiece 78 is pivoted or hinged to the rear end of the guide means 52 and has its bottom wall 80 lying in a plane below the plane of the base plate 12 and that the tailpiece 78 would ordinarily be free to drop downwardly about the pivot points 98 and 100. However, means is provided for retaining the tailpiece in secure engagement with the rear end of the guide during the normal travel of the guide on the bar, that is, with the guide 52 in substantial coplanar relationship with the bar 24.

As shown in FIGURES 5 and 6, a resilient block 118 is fixed by a fastener 120 on the upper face 122 of the bight portion or bottom wall 80 of the tailpiece and has a free forward edge 124 that abuts against and resiliently engages the transverse rear edge 126 of the body portion of the guide.

As shown in FIGURE 6, the bight portion or bottom wall 80 of the tailpiece lies below the body portion 54 of the guide 52 while the resilient block 118 is substantially coplanar therewith and the front free edge 124 of the block is in resilient abutting engagement with the transverse rear edge 126 of the body portion, thereby preventing the tailpiece from falling downwardly about the pivot points 98 and 100.

The tailpiece 78, which constitutes the hinged or pivoted portion of the guide 52 and which is disposed at the rearward end of the body portion 54, directly supports a guide member 128. The guide member 128 is of angular cross-section and has a vertical flange 130 and a horizontal flange 132, which lies subjacent the bottom wall or bight portion 80 of the tailpiece. The vertical flange 130 is adapted to abut the side 133 of a piece of material or workpiece 136, such as a board or the like, which is disposed normal to the saw 16 and through which the saw is posed to form a cut, either a square cut, that is, 90° angle, or a cut at any angle from 90° to approximately 135°, for example.

The horizontal flange 132 of the guide member 128 is pivotally attached by a bolt assembly 134, as shown in FIGURE 1, to the bottom wall or bight portion 80 of the tailpiece. The bottom wall 80 has a rearwardly extending leg portion 138, which directly underlies the frame bar 24 and is coplanar with the bight portion 80, as can be appreciated from a consideration of FIGURE 1.

The horizontal flange 132 of the right angular guide member is formed with a rearward edge portion 140 that is provided with suitable scale markings 142. An arcuate section 144 projects rearwardly from the free or rear edge portion 140 of the horizontal flange 132 of the guide member and is provided with an outer, semicurved or arcuate side edge portion 146, having suitable graduations 148 formed on its upper surface. The arcuate section 144 is formed with an arcuate slot 150 and a bolt fastener or bolt assembly 152 is adapted to fit in the slot 150 and in a suitable opening in the leg portion 138 so as to lock the guide member 128 in various angular positions about the pivot axis 134, as can be appreciated from a consideration of FIGURE 1.

The outer end 154 of the horizontal flange 132 of the guide member 128 is formed with a terminal squared off end portion 156 and an angular, rearwardly sloping end portion 158. The end portion 156, as shown in dotted lines in FIGURE 1, when the vertical flange 130 abuts the side 133 of the material 136 lies adjacent to and normal to the saw 16 and serves to guide the saw in forming a square cut through the material 136 or a cut of 90°. However, for forming a cut in the material from, for example, 90° to 135°, the bolt means 134, which constitutes the pivot, is loosened, as is the bolt means 152, so as to permit the guide member 128 to swing about the axis defined by bolt means 134 and position the end edge portion 156 in the desired angular position that the saw is to follow in forming an angular cut through the material. Of course, the bolt means 134 and 152 are locked once the desired position is realized and set, and in this respect, it can be appreciated that the guide member 128 in and of itself can be utilized to determine the proper setting, without any mental calculations or any external instruments being involved.

As aforestated and as can be appreciated from a consideration of FIGURE 3, the tailpiece, which carries the subjacent pivotally attached guide member 130, lies in a plane below the base plate 12 so that, in the event the material or workpiece 136 is of a width that is greater than the length of the base plate and the bar 24, there would be a tendency for the saw to halt and it would not be possible to push the saw further through the material so as to continue the transverse cut being formed in the material at the proper angle ordained by the setting of the guide member 128.

For this purpose, the tailpiece is pivotally attached to the body portion 54 of the guide 52 and the tailpiece carries the guide member 128. Thus, as shown in FIGURES 7 and 8, in the event that the end 28 of the base plate and the rear end of the bar 24 still have further forward travel movement in order to accommodate the movement of the saw 16 through the material 136 in completing the cut, the tailpiece and the bar 24 are provided with cooperating means whereby the tailpiece can be moved from its normal position in lengthwise relationship with the body portion 54 into an uplifted or upwardly swung position, as shown in FIGURE 8.

In this respect, the bar 24 is provided at its rearward end with laterally extending pins 160, which are adapted to be abutted or engaged by the upstanding ends 162 of the rearward vertical axles 66 which carry the rollers 68 so as to prevent the guide 52 and, in particular, the body portion 54 from moving off the rear end of the bar 24.

The underside 164 of the rear end of the bar is upwardly curved and, as the tailpiece 78 carrying the subjacent guide member 128 reaches the rear end, the vertical roller 88 rides up on the curved underside due to the fact that the flange 130 is in abutting engagement with the edge of the material and the saw 16 still has further movement to make through the material 136. The action of the retraction spring 108 which has its end 106 attached to the head 102 well above the roller tends to pull on the tailpiece. Thus, the material 136 being held against the vertical flange 130 of the guide member 128 causes the tailpiece, under the pulling action of the spring 108 to have its vertical roller roll up on the upwardly curved underside 164 of the rear end of the bar 24. The roller follows the curved underside 164 and causes the tailpiece carrying the guide member to swing upwardly so that the guide member moves above the material 136.

For square or 90° cuts, the tailpiece need not have move too far upwardly on the rear end of the bar in order to raise the guide member and lift it out of interference with the continued cutting through the material 136 by the saw 16.

However, in some angular cuts, for example 135°, the guide member 128 must swing entirely up and move to a position, such as shown in FIGURE 8. In this instance, the vertical roller 88 follows the upwardly curved underside 164 to about the point where the top surface of the bar 24 meets it. At such point, the roller 88 rides free.

The side walls 82 and 84, as shown in FIGURES 7 and 8, are formed with curved cut out portions or indentations 166, rearwardly of their forward pivoted ends, which constitute ears, in effect, pivotally cooperative with the ears 94 and 96 on the body portion 54 of the carriage means 52. The arcuate portions 166 ride onto contact with the free convex end 168 of a roll-up bar 170 that has an anchored end secured by fastener means 172 to the upper surface of the bar 24 inwardly of the rear end. The convex end 168 overlies a rod 174.

The tailpiece is constantly under the urgement of the spring 108 to swing back into its normal position in relation with the body portion 54 of the guide 52 so that when the saw completes its cut and is removed from the material the spring exerts a forward pull on the tailpiece 78 and the roller 88 rolls down on the curved underside 164 to reenter the groove 86. The guide 52, with the guide member 128 in its normal position, is pulled forwardly by the spring 108 until the body portion 54 abuts the resilient buffer member 114. There, it will be ready for the next cut.

The guide member 128 can be easily adjusted into various angular positions, as before explained and as shown in dotted lines in FIGURE 1, so that the saw 16 will be guided to form accurate angular cuts in the material or workpiece 136.

The guide means 128 can be easily removed from the base plate 12 by unfastening the wing bolts 42 and the bar 24 can be adjusted lengthwise with respect to the base plate by virtue of such wing bolts.

In making initial contact with the material or workpiece 136, the guide member 128 is held temporarily tight with its vertical flange 130 against the side edge 133 of the material 136 and the power driven saw is held in the right hand and moved forwardly so as to move the saw 16 through the material. As the saw 16 moves through the material, the left hand is moved slightly away from the guide member 128 so that the guide member is free to move rearwardly on the guide 52 and up and out of the way, as shown in FIGURES 7 and 8, if and when the guide member reaches the rear end of the support bar 24.

Apart from the obvious advantages the guide means 22 would have, there is one specific advantage intended for use with such guide means. For example, on a construction job or small addition to a house, a person might have a list of certain lengths or dimensions of lumber, such as twenty pieces of 2 x 4, thirty inches long, twelve pieces of 2 x 6, sixty inches long and the like. By using a six or eight-foot steel tape in the left hand and having the power-driven saw with the guide means 22 attached in the right hand and having a helper move the lumber in position to cut, the person can hook the tape over the right hand of the board, measure the length needed and shift the saw in position according to the reading of the tape, releasing the tape and making the cut. With just a little practice, this could speed up the measuring and cutting of random sizes of lumber tremendously and, at the same time, the size would be accurate and the cut would be of the proper angle, whether square or at any angle between 90° to approximately 135°.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a power saw including a base plate, a guide assembly including an elongated follower bar supported from said plate and generally paralleling the latter with said bar including front and rear ends and extending in the direction of advancement of the saw against a workpiece to be cut by the saw, a guide adapted to rest upon the upper surface of said workpiece, said bar being guidingly supported from said guide for lengthwise reciprocation of said bar relative to said guide, a workpiece engaging member pivotally supported from said guide for shifting between a first position with the work-engaging portion thereof depending below said guide and a second position free of portions thereof depending below said guide, said workpiece engaging member and said bar including coacting means operative to maintain said workpiece engaging member in said first position relative to said guide during shifting of said bar relative to said guide and to automatically shift said workpiece engaging member to said second position in response to shifting of said bar to a position with the rear end thereof closely adjacent said guide.

2. The combination of claim 1 wherein said work-engaging portion of said work-engaging member comprises an elongated work-engaging element pivotally supported from said work-engaging member for angular displacement about an axis extending transversely of said element and disposed in an upstanding position when said workpiece engaging member is in said first position.

3. The combination of claim 1 wherein said bar includes opposite side longitudinally extending and outwardly opening grooves and said guide includes journaled rollers whose peripheral portions are rollingly disposed in said grooves.

4. The combination of claim 1 including means connected between said bar and said guide yieldingly urging said bar toward a rearwardly displaced position relative to said guide.

5. The combination of claim 4 including resilient bumper means interposed between said bar and said guide defining a rearward limit of movement of said bar relative to said guide.

6. The invention of claim 1 wherein said guide includes a body portion and a substantially channel-shaped tail section having a bottom wall underlying the bar and carrying on its underside the workpiece-engaging member, means pivotally attaching said tail section to the body portion and means retaining the tail section in secure releasable engagement with the body portion as the carriage means moves backward and forward on the bar.

7. The invention of claim 6 wherein said bar has a bottom wall provided with an axial groove and said bottom wall of the tailpiece carries a vertical roller rotatably disposed in said axial groove.

8. The invention of claim 6 wherein said retaining means includes a resilient means connecting the tail section and the body portion.

9. The invention of claim 8, wherein said resilient means includes a resilient block fixed to the upper face of the bottom wall of the tailpiece, said bottom wall of the tailpiece lying in a plane below the plane of the body portion of the guide, said body portion of the guide lying in a plane above the base plate and having a rearward end edge which the resilient block resiliently engages.

10. The invention of claim 9, wherein said tailpiece has a forward end carrying the resilient block and having upstanding side walls, said body portion having complementary upstanding ears provided adjacent its rearward end, said walls overlapping the ears and said walls and the ears being apertured and pivot means in said apertures pivotally connecting the tail section to the body portion, said resilient means so connecting the tailpiece to the guide that it is prevented from moving downwardly therefrom about the pivot means.

11. The invention of claim 10, wherein said side walls of the support at the rearward end thereof are formed with external stops, said guide having means engaging the stops so as to limit rearward movement thereof, said bottom wall of the bar at the rearward end being upwardly curved and the vertical roller riding up said bottom wall end as the workpiece-engaging member starts to limit the cutting movement of the saw and said bar having a rearward upper surface, and means provided on said rearward upper surface and means on said tailpiece engaging said last means with the retraction spring being connected at one end to the pivot means and being operative upon removal of the base plate from the material to release the tailpiece and draw the body portion and the tailpiece toward the forward end of the bar.

12. The invention of claim 6, wherein said bottom wall of said tailpiece is of substantial T-shape and includes a transverse portion disposed transversely of the bar and carrying the resilient block, said workpiece-engaging member being pivotally attached to the underside of said transverse portion, said transverse portion having a rearward coplanar leg portion underlying the bar, said workpiece-engaging member having a slotted arcuate section formed with angular graduations and locking means carried by said arcuate section and the leg portion for locking the workpiece-engaging member in selected positions of adjustment with its guide end in angular relation to the saw.

References Cited

UNITED STATES PATENTS 3,045,724    7/1962    Mitchell _____ 143—6

DONALD R. SCHRAN, *Primary Examiner.*

U.S. Cl. X.R.

143—47